(12) United States Patent
Lotto et al.

(10) Patent No.: US 8,760,147 B2
(45) Date of Patent: Jun. 24, 2014

(54) CHARGE PULSE DETECTING CIRCUIT (75) Inventors: Christian Lotto, Zurich (CH); Peter Seitz, Urdorf (CH)

(73) Assignee: CSEM Centre Suisse d'Electronique et de Microtechnique SA—Recherche et Developpement, Neuchatel (CH)

( * ) Notice: Subject to any disclaimer, the term of this patent is extended or adjusted under 35 U.S.C. 154(b) by 361 days.

(21) Appl. No.: 13/129,635

(22) PCT Filed: Nov. 11, 2009

(86) PCT No.: PCT/EP2009/064987
§ 371 (c)(1),
(2), (4) Date: May 17, 2011

(87) PCT Pub. No.: WO2010/057816
PCT Pub. Date: May 27, 2010

(65) Prior Publication Data
US 2011/0227632 A1    Sep. 22, 2011

(30) Foreign Application Priority Data
Nov. 24, 2008   (EP) ..................................... 08169759

(51) Int. Cl.
*G01R 19/00* (2006.01)
*G01T 1/17* (2006.01)
(52) U.S. Cl.
CPC ........................................ *G01T 1/17* (2013.01)
USPC .................. 324/76.11; 324/76.19; 324/76.22; 324/76.28; 324/76.29; 250/377; 250/222.2
(58) Field of Classification Search
CPC ...... G01R 19/00; G01R 19/003; G01R 29/26; G01R 19/04
USPC .......... 324/76.11, 76.13, 76.19, 76.22, 76.28, 324/76.29; 250/377, 222.2
See application file for complete search history.

(56) References Cited

U.S. PATENT DOCUMENTS 3,350,637 A * 10/1967 Pochtar ...................... 324/76.39
3,461,318 A *  8/1969 Ordower ......................... 327/54
(Continued)

FOREIGN PATENT DOCUMENTS

| JP | 2002-350552 | 12/2002 |
|----|-------------|---------|
| JP | 2006-078235 | 3/2006 |
| WO | WO00059101 | * 10/2000 |

OTHER PUBLICATIONS

Communication from EPO dated Dec. 14, 2009 with Search Report in EP 08 169 759.2.

(Continued)

*Primary Examiner* — Patrick Assouad
*Assistant Examiner* — Lamarr Brown
(74) *Attorney, Agent, or Firm* — Preti Flaherty Beliveau & Pachios LLP (57) ABSTRACT

The current invention relates, inter alia, to charge pulse amplitude and time detecting circuits, offering very low amplitude and temporal noise, and overcoming noise performance limits in charge pulse detection circuits according to prior art. Embodiments of the present invention may include a sensing device delivering charge pulses onto a sense node, an active buffer buffering the voltage on the sense node with a low impedance, a recharge device removing signal charge from the sense node, a noise filter connected to the output of the active buffer transmitting signal voltage pulses while attenuating noise from the recharge device. Additional and alternative embodiments are specified and claimed.

20 Claims, 8 Drawing Sheets

(56) References Cited

U.S. PATENT DOCUMENTS

| | | | |
|---|---|---|---|
| 3,539,922 A * | 11/1970 | Brockman | 324/111 |
| 4,490,629 A * | 12/1984 | Barlow et al. | 326/121 |
| 4,604,571 A * | 8/1986 | Maier et al. | 324/76.53 |
| 4,920,510 A * | 4/1990 | Senderowicz et al. | 708/819 |
| 5,321,350 A * | 6/1994 | Haas | 324/76.11 |
| 5,416,798 A * | 5/1995 | Hirose et al. | 375/227 |
| 5,436,556 A * | 7/1995 | Komninos | 324/76.23 |
| 5,581,193 A * | 12/1996 | Weiss et al. | 324/76.19 |
| 7,388,210 B2 * | 6/2008 | Ouvrier-Buffet et al. | 250/370.13 |
| 8,119,972 B2 * | 2/2012 | Lotto et al. | 250/214 R |
| 8,179,119 B2 * | 5/2012 | Seitz | 324/76.38 |
| 8,190,381 B2 * | 5/2012 | Spanier et al. | 702/60 |
| 8,587,275 B2 * | 11/2013 | Nome Silva et al. | 323/282 |
| 2002/0182788 A1 * | 12/2002 | Pain et al. | 438/152 |
| 2003/0062885 A1 * | 4/2003 | Ballan | 324/76.28 |
| 2003/0218118 A1 * | 11/2003 | Kramer et al. | 250/214.1 |
| 2004/0008020 A1 * | 1/2004 | Sullivan et al. | 324/76.19 |
| 2004/0217806 A1 * | 11/2004 | Kasperkovitz | 327/552 |
| 2006/0132116 A1 * | 6/2006 | Hamre et al. | 324/76.19 |
| 2007/0025048 A1 * | 2/2007 | Gokita et al. | 361/160 |
| 2007/0158551 A1 | 7/2007 | Audebert et al. | |
| 2008/0077342 A1 * | 3/2008 | Ichiyama et al. | 702/69 |
| 2008/0088319 A1 * | 4/2008 | Ishida | 324/601 |
| 2008/0224762 A1 * | 9/2008 | Lechner | 327/551 |
| 2008/0252337 A1 * | 10/2008 | Uribe et al. | 327/60 |
| 2010/0051786 A1 * | 3/2010 | Lotto et al. | 250/214 A |
| 2010/0109640 A1 * | 5/2010 | Seitz | 324/76.38 |
| 2010/0156484 A1 * | 6/2010 | Wu et al. | 327/157 |
| 2010/0224765 A1 * | 9/2010 | Seitz et al. | 250/214.1 |
| 2012/0200277 A1 * | 8/2012 | Silva et al. | 323/284 |
| 2013/0154613 A1 * | 6/2013 | Bucsa et al. | 324/96 |
| 2013/0158920 A1 * | 6/2013 | Bucsa et al. | 702/64 |

OTHER PUBLICATIONS

Communication from EPO dated Jul. 12, 2011 in EP 08 169 759.1.
Communication from EPO dated Dec. 13, 2011 in EP 08 169 759.1.
English Translation, Japanese Office Action in corresponding Japanese Application No. 2011-536825, mailed Feb. 12, 2014, pp. 1-4.

* cited by examiner

CHARGE PULSE DETECTING CIRCUIT

FIELD OF THE INVENTION

The current invention generally relates to charge pulse and current pulse amplitude and time detecting circuits. In particular, the invention relates to charge pulse detecting circuits using optoelectronic sensing devices as well as arrays thereof and to X-ray photon detecting and counting applications.

DESCRIPTION OF THE FIGURES

Features and advantages of the invention will become apparent in the light of the ensuing description of some embodiments thereof, given by way of example only, with reference to the accompanying figures, wherein.

LIST OF ABBREVIATIONS

| | |
|---|---|
| RMS | root mean square |
| DC | direct current |
| AC | alternating current |
| MOS | metal oxide semiconductor |
| CMOS | complementary metal oxide semiconductor |
| PSD | power spectral density |
| W/L | ratio of the gate width over the gate length of a MOS transistor |

BACKGROUND OF THE INVENTION

Current pulse detecting circuits are used for a wide range of applications including sensors which contain a sensing device able to deliver electrical charge representing the sensed physical property. In order to detect minute changes of the sensed physical property, detecting circuits providing a high charge to voltage conversion factor and low noise at high bandwidth are of a major interest.

Figure 1:
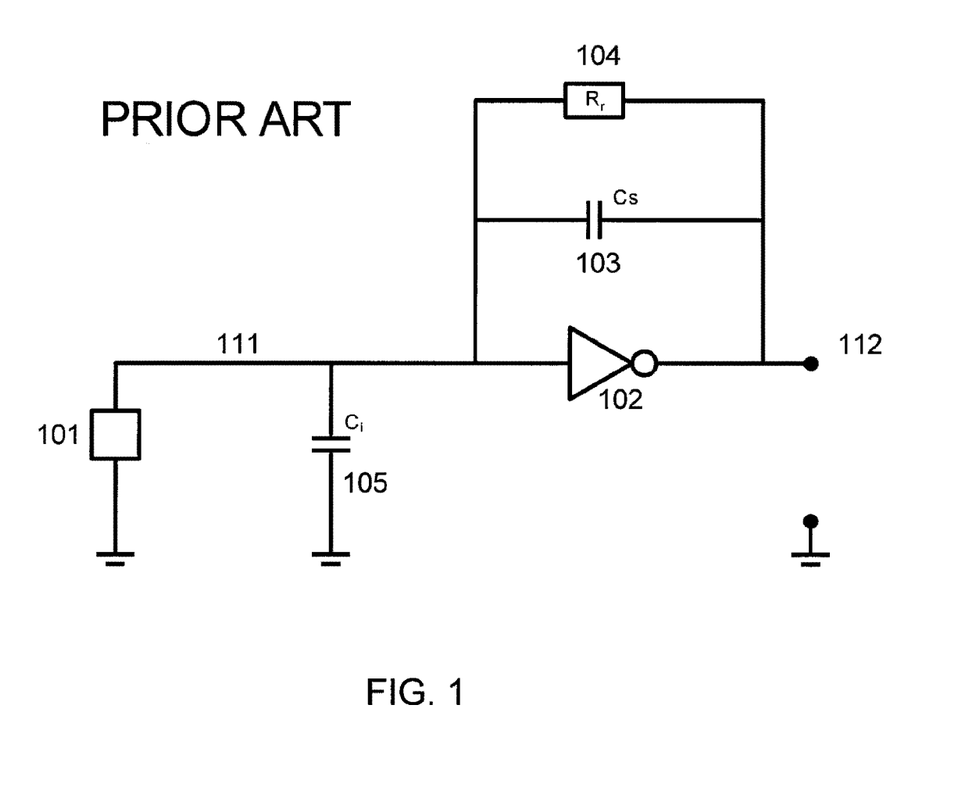
FIG. 1 is an schematic illustration of a charge pulse detecting circuit according to the prior art.

With reference to FIG. 1, state of the art charge pulse detecting circuits usually comprise a sensing device 101 delivering an amount of charge which represents the sensed physical property to an input node 111, an inverting amplifier 102 and a sense capacitor 103 configured to form a capacitance feedback amplifier, a recharge resistor 104 in parallel with sense capacitor 103 and an input capacitor 105 which may be a parasitic capacitance. For short current pulses delivered by sensing device 101 and high values of recharge resistor 104, amplifier 102 produces on an output node 112 a voltage pulse with a pulse height defined by the integrated charge of the input current pulse and the capacitance value of sense capacitor 103. The input charge is subsequently slowly removed from input node 111 across recharge resistor 104, and a stable DC operation voltage point is established on input node 111 by feedback operation of amplifier 102 and recharge resistor 104. State of the art charge pulse detecting circuits are described in G. Lutz, "Semiconductor Radiation Detectors", pp. 190, Springer, Berlin; Heidelberg.

Circuit analysis shows that, for the case of an inverting amplifier 102 with a sufficiently high gain-times-bandwidth product, the charge detecting circuit's input current to output voltage transimpedance function may be approximated as:

$$\frac{v_o}{i_{in}} \cong \frac{1 - s\frac{C_l}{gm_A}}{(1 + sR_rC_s)\left(1 + s\frac{1}{gm_A}\left(C_s + C_i + \frac{C_lC_i}{C_s}\right)\right)} \quad (1)$$

wherein $v_o$ is the ac voltage on output node 112, $i_{in}$ is the ac current delivered by sensing device 101, $C_l$ is a load capacitance connected to output node 112, $gm_A$ is the transconductance of amplifier 102, $R_r$ is the resistance value of recharge resistor 104, $C_s$ is the capacitance value of sense capacitor 103, $C_i$ is the sum of capacitance from input node 111 to any ac ground node, and s is the complex signal frequency. Note that alternative mathematical terms may be used to represent the approximation of the transimpedance function.

For frequencies above $\frac{1}{2}\pi R_rC_s$ but below the zero frequency and the second pole frequency, the transimpedance is approximately equal to $1/sC_s$ i.e. to the sense capacitance impedance. Therefore, a high charge to voltage conversion factor may be achieved if $C_s$ is small and $R_rC_s$ is longer than the width of the detected current pulses.

The major noise sources in the discussed state of the art current pulse detecting circuit are amplifier 102 and recharge resistor 104. Noise contributed by amplifier 102 can be arbitrarily reduced by increasing load capacitance, amplifier transconductance and amplifier transistor device area. Circuit analysis under the same assumptions as above yields the following approximation of the output noise power spectral density due to the thermal noise caused by recharge resistor 104:

$$S_{V_O} \cong 4kTR_r \left| \frac{1 + sC_igm_A}{(1 + sR_rC_s)\left(1 + s\frac{1}{gm_A}\left(C_i + C_i + \frac{C_lC_i}{C_s}\right)\right)} \right|^2 \quad (2)$$

Note that alternative mathematical expressions may be used to represent the approximation of the recharge resistor noise power spectral density. Neglecting the effects of the zero and second pole at high frequency, the input node charge RMS variation $q_{ni, Rr, prior\ art}$ equivalent of the recharge resistor noise can be approximated as:

$$q_{ni, Rr, prior\ art} \cong \sqrt{\frac{kT}{C_s}} \quad (3)$$

wherein k is the Boltzmann Constant and T is the absolute temperature in K. Note that different alternative expressions may be used to represent the recharge resistor noise equivalent input charge. We note that low capacitance values of sense capacitor 103 are desirable in order to achieve low detecting circuit noise i.e. high signal to noise ratio at low charge amounts delivered by sensing device 101. There are, however, practical limits to the capacitance value Cs, mainly determined by the constraints of fabrication processes. Therefore, the noise performance of state of the art pulse detecting circuits is limited for a given process technology.

DESCRIPTION OF THE INVENTION

The present invention refers, inter alia, to charge pulse detecting circuits. An embodiment of the present invention may comprise a sensing device delivering charge pulses representing the amplitude of a sensed physical property onto a sense node, an active buffer circuit buffering a voltage from the sense node to a buffer output node, a recharge device recharging the sense node to a physical or virtual DC potential with a high but finite DC impedance and a noise filter circuit filtering the output voltage of the buffer, to reduce noise from the recharge device and providing an output voltage on an output node. The noise due to the recharge device observed on said output node is reduced to an equivalent RMS variation of, for example, less than 50, 40, 30 or 20 electrons or holes. This is, for example, several times less than the value of the unfiltered noise due to the recharge device observed on the sense node. For example, the filtered noise may be, for example, 0.5, 0.3, 0.2 or 0.1 times the value of the unfiltered noise.

Embodiments may use employ a MOS source follower circuit as an active buffer.

Embodiments may employ, as an active buffer, an inverting voltage amplifier providing a voltage gain greater than unity.

In embodiments the recharge device may be embodied by a resistor connected between the sense node and a DC potential.

In embodiments the recharge device may be embodied by a recharge resistor connected between the sense node and the output node of the inverting voltage amplifier with its input node connected to the sense node as well.

Embodiments may employ, as a recharge device, a switch that connects the sense node to a the physical or virtual DC potential with low impedance in first state, which may be established in regular or irregular intervals of time, and that, in a second state, isolates the sense node from said DC potential through a relatively high, ideally virtually infinite impedance in connection with this embodiment. It should be noted that the term "isolate" and grammatical variations thereof also encompasses the meaning "substantially" isolate. If a MOS transistor is used as a switch, the impedance of said switch may be, for example, higher than $10^{12}$ Ohms in its open state.

Embodiments may use a noise filter providing band-pass or high-pass frequency domain behaviour. The noise filter may incorporate an active circuit yielding a charge pulse detecting circuit with an output impedance low enough to drive load capacitors of, for example, up to several pico-Farads.

Embodiments may use, as a noise filter, an active band-pass or high-pass filter providing voltage amplification in its passing band of frequencies.

Embodiments of the invention allow asynchronous continuous amplitude and arrival time detection of charge pulses with a very low detection limit ranging, for instance, from two to 100 electrons or holes per pulse only. The invention exploits knowledge of the width of the detected pulses through noise filtering in unused frequency ranges. Embodiments of the invention may be adapted to rather long pulses, e.g. in the range of 5, 3, 4 or 1 microseconds, as well as for quite short pulses, e.g. in the range of 20, 10, 5, 3 or 1 nanosecond, using standard integrated circuit fabrication technologies. Embodiments of the invention can be built as compact circuits that may be used as pixel circuits in one-dimensional or two-Dimensional integrated circuit sensor arrays.

In the following, a description of some embodiments of the present invention is provided. These embodiments should be considered as examples and their choice is not to be construed as limiting. Modifications of the described embodiments may be apparent to those skilled in the art without deviating from the scope of the invention.

Figure 2:
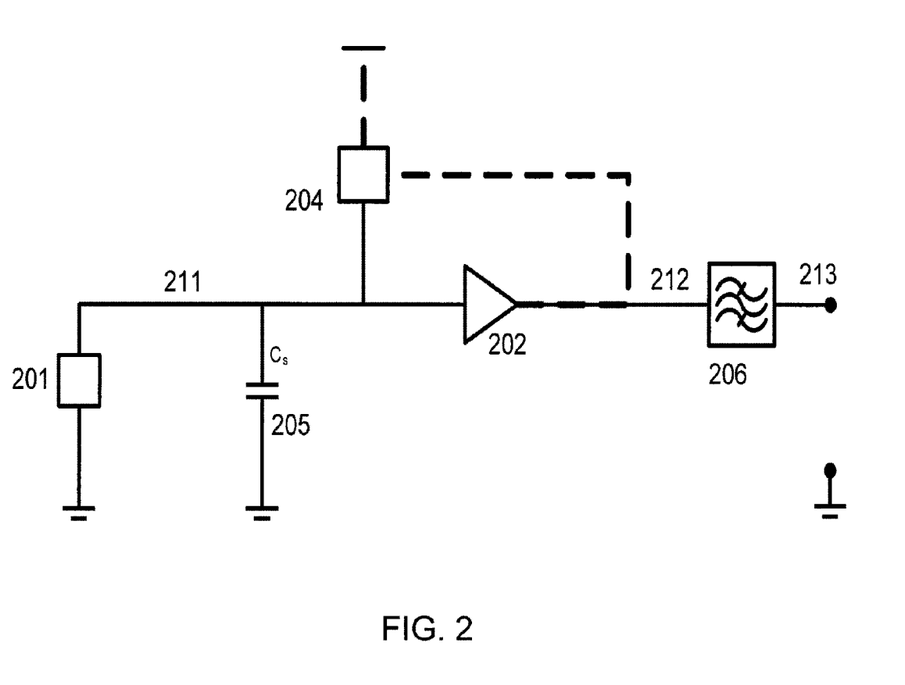
FIG. 2 is a schematic illustration of an embodiment of a general architecture of a charge pulse detecting circuit according to an embodiment of the invention.

Referring to FIG. 2 an embodiment of the invention may possibly but not necessarily comprise the following elements:
- a sensing device 201 delivering providing to a sense node 211 a charge pulse representing the magnitude of the a sensed physical property.
- an active buffer 202 with its input connected to sense node 211 and its output connected to a buffer output node 212. In one embodiment, active Buffer 202 may provide voltage amplification. In another embodiment, active buffer 202 does not provide voltage amplification.
- a recharge device 204 with at least one first terminal connected to sense node 211 and at least one second terminal connected to either a fixed potential or buffer output node 212.
- a continuous time noise filter 206 with its input connected to buffer output node 212 and its output connected to an output node 213.
- a sense capacitor 205 connected between sense node 211 and a DC potential.

Sense Capacitor 205 may be a parasitic capacitance.

A charge pulse delivered provided by sensing device 201 onto sense node 211 results in a transition of the voltage on sense node 211 with a transition time substantially equal to the charge pulse width. Please note that the term "equal" as used herein also encompasses the meaning "substantially equal". In the case of negative signal charge, for instance, a falling voltage edge is obtained. This voltage transition is hereinafter referred to as "signal edge" in the text hereinafter.

Recharge device 204 subsequently removes the signal charge from sense node 211 and establishes a well defined DC voltage on sense node 211. During the described recharge process we obtain a voltage transition on sense node 211 opposite to the signal edge. This voltage transition is hereinafter referred to as "recharge transition". Recharge device 204 is designed such that the recharge time, i.e. the duration of the recharge transition, is significantly longer, e.g. at least twice as long, than the duration of the signal edge, i.e. the charge pulse width. Implementations of the recharge device therefore include but are not limited to high but finite DC impedance paths to a fixed voltage or high but finite DC impedance paths to buffer output node 212 in case active buffer 202 is an inverting voltage amplifier. In the latter case a stable DC input voltage is established by feedback operation of active buffer 202 and recharge device 204. It should be noted that the term "stable" as used herein also encompasses the term "substantially" stable.

It is worth mentioning that in correspondence to the relatively long recharge time, the noise bandwidth of the voltage noise power spectrum on sense node 211 is quite small, and the voltage noise power spectral density on sense node 211 is relatively high due to the high DC impedance of recharge device 204.

Active buffer 202 is used in order to provide a voltage signal, representing the sense node voltage, driven with low impedance while keeping the impedance of sense node 211 high i.e. the capacitance value of sense capacitor 205 low. Active buffer 202 may or may not provide voltage gain and may be inverting or non-inverting. Note that both the signal edge as well as the recharge transition are reproduced on buffer output node 212.

Noise filter 206 generally is a continuous time filter eliminating noise from unused frequency ranges while transmitting the signal edge. It should be noted that the term "eliminating" also encompasses the term "substantially eliminating". In particular, low frequencies, where most of the recharge device noise power resides, are filtered out. This may involve filtering of the recharge transition.

Noise filter 206 may be a high pass-filter or a band-pass filter. Note that a high-pass filter commonly generates large high-frequency noise itself. A band-pass filter limiting the bandwidth of its self-generated noise commonly contributes less self-generated noise and may thus be preferable. When using a band-pass filter, however, particular attention has to be paid to the choice and control of the upper band limit frequency, in order to avoid undesired attenuation of the signal edge.

Noise filter 206 may be passive or active and may or may not apply a voltage gain greater than unity to the signal edge.

Sensing devices with charge output include but are definitely not limited to optoelectrical sensors such as, for example, homojunction photodiodes, heterojunction photodiodes, pinned-photodiodes and/or photogate type detectors, as employed for example in Charge Coupled Devices (CCDs).

Figure 3:
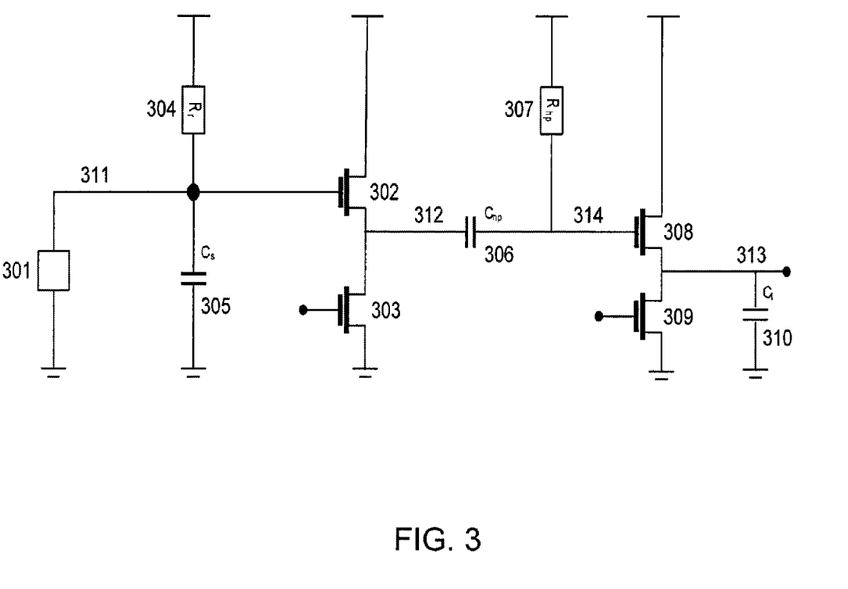
FIG. 3 is a schematic illustration of a particular charge pulse detecting circuit employing MOS transistors, according to an embodiment of the invention.

Reference is now made to FIG. 3, which schematically illustrates an embodiment of the present invention using MOS transistors where recharge device 204 is implemented as recharge resistor 304 with at least one first terminal connected to sense node 311 and at least one second terminal connected to a DC potential.

Active buffer 202 is implemented as a unity gain source follower buffer comprising a source follower transistor 302 and a current source transistor 303.

Noise filter 206 comprises a high-pass filter capacitance 306 and a high pass filter resistor 307 forming a passive high-pass filter, as well as a band-limiting source follower transistor 308, a current source transistor 309 and a band-limiting capacitor 310 forming an active low-pass filter cascaded with the passive high-pass filter. The described configuration results in an actively buffered band-pass filter with unity gain in the passing band of frequencies, with its input being a buffer output node 312 and its output being the output node 313 of the pulse detecting circuit.

As explained above, the resistance of recharge resistor 304 needs to be relatively high in order to limit the bandwidth of the recharge resistor noise to relatively low frequencies. For a charge pulse detecting circuit able to detect pulses of relatively high width, for example up to a microsecond, with a capacitance value of sense capacitor 305 of, for instance, 2 to 20 femto-Farads, the resistance value of recharge resistor 304 needs to be in the range of, for instance, $10^9$ Ohms in order to limit the noise of recharge resistor 304 to sufficiently low frequencies.

We also mentioned before that noise filter 206 needs to transmit the signal edge; this demands that the time constant of the high pass filter, which may comprise high-pass filter capacitor 306 and high-pass filter resistor 307, needs to be larger than or equal to the width of the detected charge pulses. For a charge pulse detecting circuit that can be used in 2-dimensional arrays manufactured using typical semiconductor processing technology the capacitance value of high-pass filter capacitor 306 is practically limited to values, for example, below 2 pico-Farad, 1 pico-Farad, or 0.5 pico-Farad affecting a corresponding impedance, in order to avoid excessive circuit area. If such a charge pulse detecting circuit is used to detect charge pulses of a width in the range of, for instance, a microsecond, the required resistance value of high-pass filter resistor 307 ranges, for instance, from 1 Mega-Ohm to several tens of Mega-Ohms such as 20, 30, 40, 50, 60, 70, 80 or 90 Megaohms.

Implementations of recharge resistor 304 and high-pass filter resistor 307 providing the required high resistance using MOS processing technology may include, inter alia, MOS transistors operated in strongly inverted non-saturated region (triode region) and MOS transistors operated with a weakly inverted channel (sub-threshold operation) and low drain-source voltage.

The discussed examples of resistor implementations should not be construed as limiting. Different implementations will be apparent to those skilled in the art without deviating from the scope of the present invention. Furthermore it should be noted that different transistor types than depicted in FIG. 3 may be used in order to achieve equivalent functionality.

Figure 4:
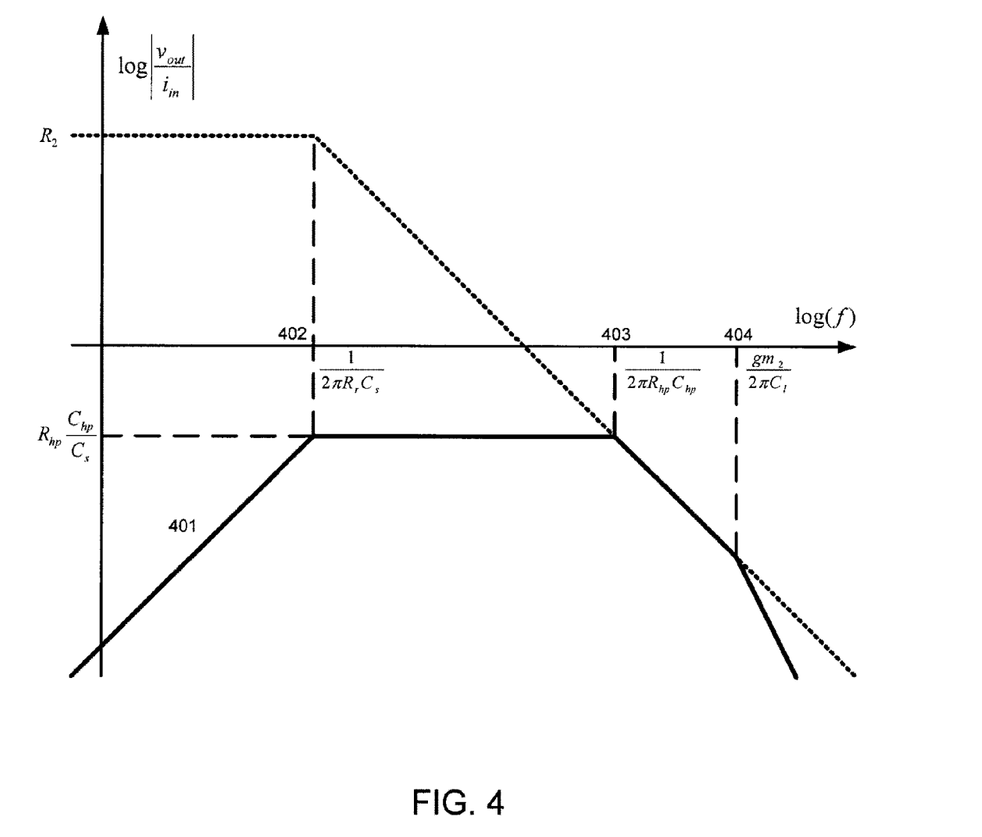
FIG. 4 is an schematic illustration of an input signal current to output voltage transimpedance function that corresponds to the embodiment schematically illustrated in FIG. 3.

Referring now to FIG. 4, the amplitude of the signal transimpedance function 401 of the pulse detecting circuit depicted in FIG. 3 gives the ratio of the ac voltage $v_{out}$ on output node 313 to an ac input current $i_{in}$ provided to sense node 311 by sensing device 301.

For frequencies f in the passing band of the band-pass filter, i.e. between the high-pass filter transition frequency 403 approximately equal to $1/2\pi R_{hp} C_{hp}$ and the band limiter transition frequency 404 approximately equal to $gm_2/2\pi C_l$, the signal transimpedance function substantially corresponds to $1/sC_s$, i.e. the signal charge to voltage conversion factor is defined by the sense capacitor 305 and is essentially constant. In the expressions mentioned above, $R_{hp}$ is the resistance of high-filter resistor 307, $C_{hp}$ is the capacitance of high-pass filter capacitor 306, $gm_2$ is the transconductance of band-limiting source follower transistor 308 and $C_l$ is the capacitance of band-limiting capacitor 310.

Figure 5:
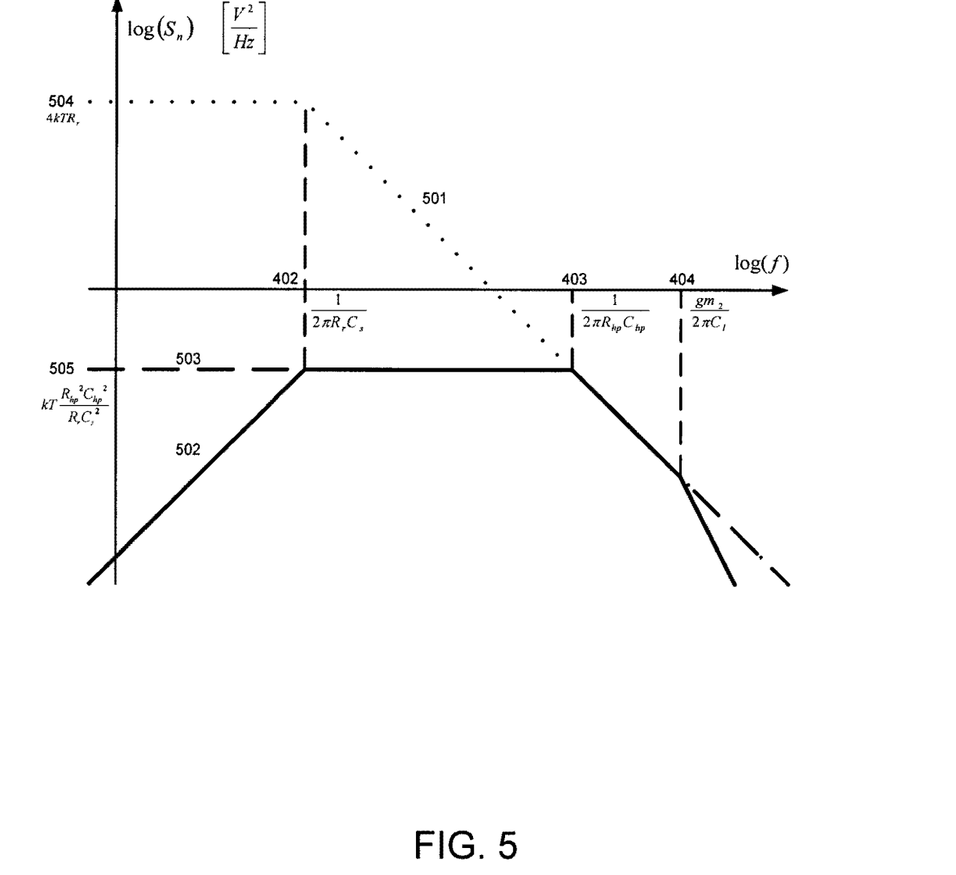
FIG. 5 is a schematic illustration of the unfiltered and filtered power spectral densities of the noise generated by a recharge device corresponding to the embodiment schematically shown in FIG. 3.

Referring now to FIG. 5, the unfiltered recharge resistor noise PSD 501 corresponds to the noise power spectral density of recharge resistor 304 observed on sense node 311 which is essentially described by a low-pass function with a DC PSD level 504 at a value of 4kTRr and its transition frequency corresponding to recharge transition frequency 402. Note that high resistance values of recharge resistor 304 lead to unfiltered recharge noise PSD 501 with a high DC PSD and a low bandwidth. The statistical charge RMS variation $q_{n,sN}$, equivalent to the voltage noise on sense node 311, is found to be:

$$q_{n,SN} = \sqrt{kTC_s} \quad (4)$$

The filtered recharge resistor noise PSD 502 corresponds to the noise power spectral density observed on output node 313 caused by recharge resistor 304 computed under the approximation of exact unity gain for both the active buffer consisting of source follower transistor 302 and current source transistor 303, as well as the band-limiting buffer comprising band-limiting source follower transistor 308 and current source transistor 309. Note that filtered recharge resistor noise PSD 502 has a constant maximum PSD level 505 corresponding to 4kT $R_{hp}^2 C_{hp}^2 / R_r C_s^2$ and a pole takes effect at high-pass filter transition frequency 403. The RMS output noise due to recharge resistor 304 corresponds to the square root of the integral of filtered recharge resistor noise PSD 502 over the entire frequency range. Approximation 503 of filtered recharge resistor noise PSD 502 is an approximation that results in an overestimated but simple expression for the RMS output noise. Using approximation 503 we find the following expression term of the input charge RMS variation equivalent to the noise of recharge resistor 304:

$$q_{ni,Rr} \leq \sqrt{kT \frac{R_{hp} C_{hp}}{R_r}} \quad (5)$$

Comparing this result to EQN. 4 we find that the noise filter attenuates RMS noise from the recharge resistor 304 with a factor of the square root of the ratio of the recharge transition frequency 402 over the high-pass filter transition frequency 403. Consequently, the noise reduction factor can be approximated by the term: $\sqrt{R_{hp} C_{hp} / R_r C_s}$.

Note that, despite the fact that according to the present invention the input charge RMS variation equivalent to the recharge resistor noise is substantially independent of the capacitance of sense capacitor 305, as visible from EQN. 5, low sense node capacitance remains a very efficient means to reduce the equivalent input charge corresponding to other noise sources as e.g. the self-generated noise of the active buffer or the noise filtering circuit itself.

A correctly dimensioned charge pulse detecting circuit according to an embodiment of the invention provides noise reduction factors ranging, for example, from greater than two to a hundred. The upper mentioned value of the noise reduction factor is defined by practical limitations explained in the following paragraphs. Typical values of RMS input charge variation equivalent to the output noise contributed by the recharge resistor range from, for example, two to a hundred holes or electrons.

For a given high-pass frequency, which is substantially defined by the width of the pulses to be detected, and a minimized capacitance $C_s$ of sense capacitor 305, a practical limit to the noise reduction effect is usually found due to high required resistance values of recharge resistor 304.

Furthermore, reducing the recharge transition frequency, i.e. increasing duration of the recharge transition, decreases the maximum average repetition rate of the pulses that can be reliably detected, which may also impose an ultimate practical limitation to the possible noise reduction effect.

Besides reducing the effect of the most dominant noise source of known charge pulse detecting circuits, the charge pulse detecting circuit according to the present invention also allows controlling the contributions of its remaining noise sources by proper dimensioning of its elements.

Thermal noise of source follower transistor 302 and current source transistor 303 may be decreased by increasing their transconductance values, while keeping band-limiter transition frequency 404 constant.

Thermal noise of high pass filter resistor 307 may be reduced e.g. by decreasing its resistance value and simultaneously increasing the capacitance of high-pass filter capacitor 306 by inverse proportion, in such a way that high-pass filter transition frequency 403 remains constant.

Thermal noise from band-limiting source follower transistor 308 and current source transistor 309 may be reduced by increasing the capacitance value of band-limiting capacitor 310 as well as the transconductance of band-limiting source follower transistor 308 proportionally and keeping the transconductance of current source transistor 309 lower (e.g., by a factor of 0.5) than the transconductance of band-limiting source follower transistor 308.

Figure 6:
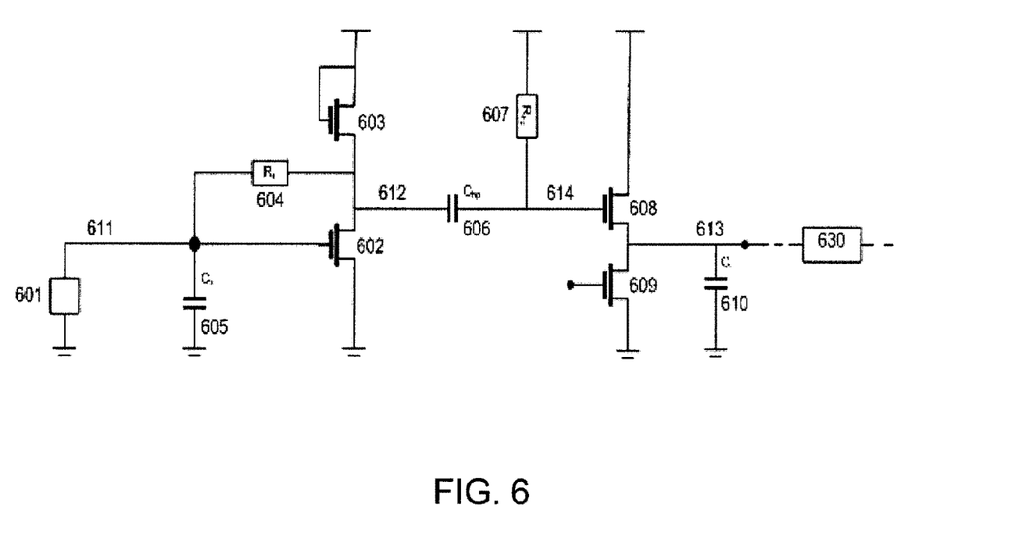
FIG. 6 is a schematic illustration of a particular charge pulse detecting circuit comprising an inverting voltage amplifier and a recharge device connected between a sense node and the output of the inverting voltage amplifier, according to an alternative embodiment of the invention.

FIG. 6 schematically depicts another embodiment of the present invention, where active buffer 202 provides voltage amplification and is implemented as a common source amplifier transistor 602 and an active load transistor 603. Note that this implementation of active buffer 202 is an inverting amplifier, i.e. its AC output voltage has inverse polarity with respect to its AC input voltage. Active load transistor 603 is connected in a diode configuration and its W/L ratio is chosen to be smaller than the W/L ratio of common source amplifier transistor 602, in order to provide open loop gain larger than unity. Note that the described implementation of active buffer 202 providing voltage amplification is not to be construed as limiting. Further examples of possible implementations include but are not limited to common source amplifiers with active current source loads, cascoded common source amplifiers with either diode connected or current source active loads and CMOS inverters. Note that different transistor types than schematically depicted in FIG. 6 may be used to achieve equivalent functionality.

In the described embodiment, signal charge delivered from a sensing device 601 onto a sense node 611 is removed across a recharge resistor connected between said sense node 611 and an amplifier output node 612. The DC potentials on sense node 611 and amplifier output node 612 are thus set to essentially the same non-saturated operating voltages by feedback operation of recharge resistor 605 and the active buffer providing voltage amplification.

In this embodiment the implementation of noise filter 206 may be essentially identical to the implementation depicted in FIG. 3.

In the case of the discussed embodiment for a given capacitance Cs of the sense capacitor 605 and a given resistance $R_r$ of a recharge resistor 604, the recharge transition frequency is found to be $Av/2\pi R_r C_s$ where Av is the DC voltage amplification of the amplifier comprising common source amplifier transistor 602 and active load transistor 603. Note that, as an effect of feedback operation, the recharge transition frequency is increased by a factor of the voltage amplification with respect to a recharge resistor connected to a DC potential rather than amplifier output 612.

For a given width of the charge pulses to be detected and a resulting maximum high-pass filter frequency, higher resistance values of recharge resistor 604, than for instance in the embodiment of FIG. 3, may be needed in order to attenuate the noise due to recharge resistor 604 to a desired level.

An important advantage of embodiments of charge detecting circuits employing an implementation of active buffer 202 providing voltage amplification larger than unity is, that excellent conversion factors of output voltage on amplifier output node 612 over input charge on sense node 611, for example ranging from 50 micro-volts to 5 milli-volts per electron or hole, may be obtained. This reduces the input charge noise equivalent to the self-generated noise of the noise filter as well as further downstream readout circuitry 630. Therefore, requirements for the self-generated noise of the noise filter circuit may be less stringent, while not compromising the overall noise performance of the detecting circuit. In particular, less semiconductor area may be needed for high-pass filter capacitor 606 and band-limiting capacitor 610. Furthermore, the transconductance and thus the current consumption of band limiting source follower transistor 608 in the currently discussed embodiment might be reduced, for example by a factor ranging from two to the voltage gain of active buffer 202, compared to band limiting source follower transistor 308 in the embodiment wherein active buffer 202 does not provide voltage amplification.

Figure 7:
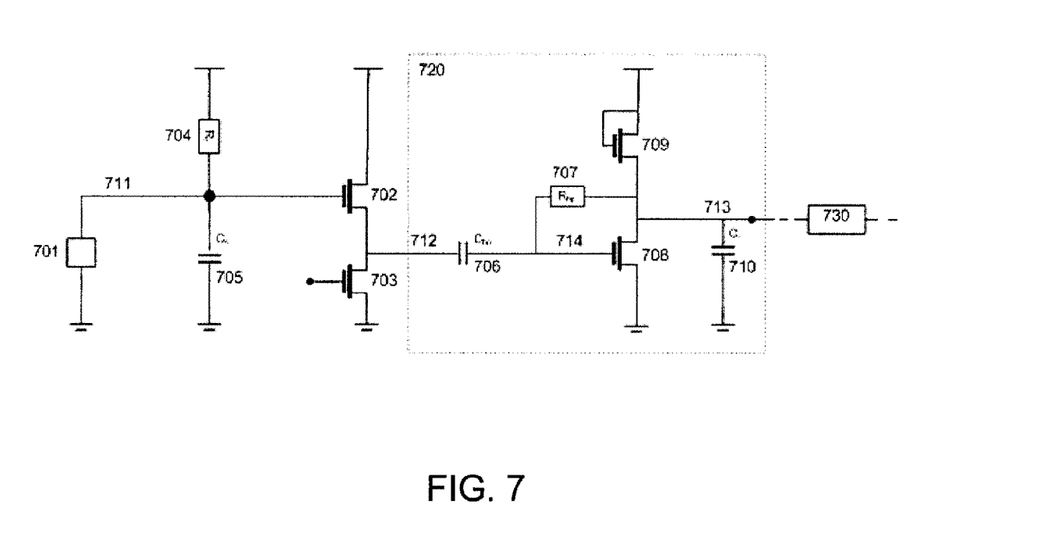
FIG. 7 is a schematic illustration of a particular charge pulse detecting circuit, comprising an active band-pass type noise filter imparting voltage amplification to the signal voltage pulses, according to another embodiment of the invention.

Referring now to FIG. 7, an embodiment of the present invention is schematically depicted, wherein noise filter 206 is an active filter, and wherein noise filter 206 provides voltage amplification larger than unity to the signal edge, i.e. it provides voltage amplification in its passing band of frequencies. Recharge device 204 and active buffer 202 of the disclosed embodiment may be essentially identical to the corresponding elements of the embodiment schematically shown in FIG. 3.

A noise filter 720 of this embodiment may comprise a high pass filter capacitor 706 with its terminals connected to a buffer output node 712 and an intermediate node 714, a band-pass filter amplifier transistor 708 and an active load transistor 709 forming an inverting voltage amplifier amplifying the voltage on intermediate node 714 to an output node 713, a band-limiting capacitor 710 connected to output node 713 and a high-pass filter resistor 707 connected between intermediate node 714 and output node 713.

A stable DC operating voltage on intermediate node 714 is established by feedback operation of the inverting voltage amplifier and high-pass filter resistor 707. Active load transistor 709 is connected in a diode configuration and its W/L ratio is chosen to be smaller than the W/L ratio of band-pass filter amplifier transistor 708 in order to provide open loop gain greater than unity. Note once more that the implementation of this amplifier is not to be construed as limiting. Other amplifier types may be used without deviating from the scope of the present invention. Furthermore different transistor types than depicted in FIG. 7 may be used to achieve equivalent functionality.

The transfer function of noise filter 720, i.e. the ratio of the voltage on output node 713 over the voltage on intermediate node 714 $H_{nf}(s)$ can be approximated by the expression (EQN. 6) below, under the assumption of sufficient transconductance $gm_2$ of band-pass amplifier transistor 708, a resistance $R_{hp}$ of high-pass filter resistor 707 larger than the DC output impedance Ro of the inverting voltage amplifier and neglecting the parasitic capacitance on intermediate node 714.

$$H_{nf} \cong \frac{sgm_2 R_o R_{hp} C_{hp}}{(1 + sR_{hp}C_{hp})(1 + sR_o C_l)} \quad (6)$$

In EQN 6 $R_{hp}$ is the resistance of high-pass filter resistor 707, $C_{hp}$ is the capacitance of high-pass filter capacitor 706 and $C_l$ is the capacitance of band-limiting capacitor 710. The above expression furthermore is based on the assumption that the product of $R_{hp}C_{hp}$ is larger than $R_o C_l$.

We thus observe that noise filter 720 is a band-pass filter with a lower band limit a the frequency of $1/2\pi R_{hp}C_{hp}$, the upper band-limit at the frequency of $1/2\pi R_o C_l$ and a voltage amplification in the passing band of $gm_2 R_o$, i.e. the voltage amplifier open loop gain.

Therefore, for a given width of the charge pulses to be detected and a given desired attenuation of the thermal noise from recharge resistor 704, the same dimensions of high-pass filter resistor 707 and high-pass capacitor 706 as in a noise filter without voltage amplification such as depicted in FIG. 3 and FIG. 6 may be used.

If a MOS transistor is employed in strong inversion triode region and/or even weak inversion mode is used in order to implement high-pass filter resistor 707, attention has to be paid to the proper biasing of the gate of said MOS transistor, in order to avoid excessive resistance variations. Due to the fact that the required resistance values of high-pass filter resistance are generally lower than, for instance, the required resistance of recharge resistor 609, the implementation of the embodiment of FIG. 7 may be less complex, in practice, than the implementation of the embodiment of FIG. 6, and high-pass filter resistor 707 may be subjected to lower relative resistance variation than, for instance, recharge resistor 609.

The embodiment of FIG. 7 provides high conversion factor values of input charge on sense node 711 to output voltage on output node 713, for example ranging from 50 micro-volts to 5 milli-volts per electron or hole, thanks to voltage amplification in noise filter 720. Therefore, this embodiment offers excellent immunity against noise from downstream readout circuitry 730. However, due to unity gain in the active buffer, as opposed to the embodiment shown in FIG. 6, attention has to be paid to noise from the noise filter 720 itself, just as in the embodiment schematically shown in FIG. 3.

Figure 8:
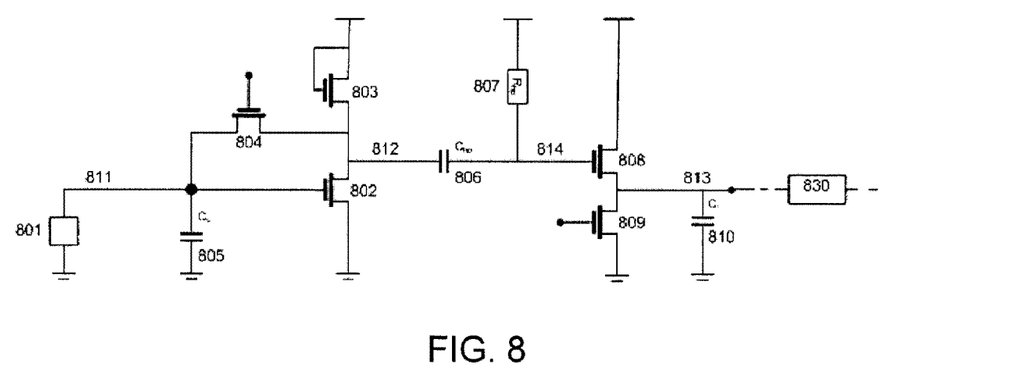
FIG. 8 is a schematic illustration of a particular charge pulse detecting circuit wherein the recharge device is embodied by a reset switch that is closed for resetting the sense node and left open during pulse detection, according to a yet alternative embodiment of the invention.

FIG. 8 schematically depicts yet another embodiment of the present invention, where the signal charge is removed from a sense node 811 across a low impedance path in regular or irregular time intervals, instead of slowly and continuously removing signal charge across a high impedance path after the arrival of every charge pulse the from a detector 801.

The noise filter, as well as the active buffer formed by common source a amplifier transistor 802 and active load transistor 803, may be essentially identical to their respective counterparts in the embodiment of FIG. 6. The recharge device used in the present embodiment, however, is a reset switch transistor 804 with one of its drain/source terminals connected to sense node 811 and one drain/source terminal connected to the amplifier output node 812.

The gate terminal of reset switch transistor 804 is pulsed such that said reset switch transistor 804 is closed for a relatively short time, for example a duration in the range of the width of the detected pulses, in regular or irregular intervals, and it is left open in the periods in-between that may have a duration corresponding, for example, to 10 to 1000 times the width of the detected pulses.

When reset switch transistor 804 is closed, signal charge is removed across the low impedance path provided by said reset switch transistor 804, and non-saturating amplifier input and output voltages are established on sense node 811 as well as on amplifier output node 812 by negative feedback operation of the inverting amplifier and reset switch transistor 804. Other transistor types than the depicted n-channel MOS transistor depicted in FIG. 8 may be used to implement reset switch transistor 804.

Note that, if any signal charge is available on sense node 811, a voltage pulse triggered by the closing of reset switch transistor 804 appears on an output node 813. This output voltage pulse corresponding to the reset action has an amplitude depending on the amount of signal charge integrated on the sense node capacitor 805 between the previous reset action and the current reset action and a decay time corresponding to the product of the resistance of high-pass resistor 814 times the capacitance of the high-pass filter capacitor 806. Note that the output voltage pulse corresponding to the reset action has a polarity that is opposite to the polarity of output voltage pulses caused by signal charge pulses from sensing device 801. For example, if signal charge pulses comprise electrons, signal voltage pulses on output node 813 have positive polarity whereas reset voltage pulses on output node 813 have negative polarity. Thanks to their opposite polarities, reset pulses can be easily distinguished from signal pulses, besides the fact that the arrival time of reset pulses is well known.

Also note that a dead time, during which no signal pulses can be detected, exists while reset switch transistor 804 is closed.

The noise from reset switch transistor 804 observed at sense node 811 is frozen once said reset switch transistor 804 is opened, i.e. it mainly comprises a DC component and no substantial higher frequency spectral component. Such noise is, theoretically, completely eliminated by the high pass function of continuous time noise filter 206. I should be noted that the term "completely" also encompasses the term "substantially completely".

Thanks to the efficient suppression of recharge noise and the excellent immunity against noise from downstream circuitry 830 and noise filter noise due to voltage amplification provided by the active buffer, this embodiment of the present invention offers overall RMS input charge variations equivalent to the overall output noise lower than, for example, ten electrons or holes.

The invention claimed is:

1. A charge pulse detecting circuit comprising:
   a) a sensing device;
   b) a sense node;
   c) an active buffer having an input and an output;
   d) a recharge device comprising at least one first and second terminals; and
   e) a noise filter having an input and an output node;
   the sensing device being operatively coupled with the sense node to deliver charge pulses to the sense node;
   the input of the active buffer being connected to the sense node;
   the at least one terminal of the recharge device connected to the sense node to enable establishing a stable DC potential on the sense node; and
   the noise filter input being connected to the active buffer output, such that, during the transmission of voltage signals responsive to the charge pulses at the sensing device, the RMS input charge variation at the output node contributed by the recharge resistor is reduced to an equivalent of less than 50 charge carriers.

2. The charge pulse detecting circuit according to claim 1, where the active buffer is a unity gain buffer and wherein the at least one second terminal is connected to a fixed DC potential.

3. The charge pulse detecting circuit according to claim 1, wherein the active buffer is an inverting amplifier and wherein the at least one second terminal of the recharge device is connected to the output of the inverting amplifier.

4. The charge pulse detecting circuit according to claim 1, wherein the recharge device is a high but finite DC impedance path establishing a stable DC potential on the sense node while substantially confining the noise power of the recharge device in a low frequency range wherein noise is attenuated by the noise filter resulting in an attenuation of the noise of the recharge device by at least a factor of two.

5. The charge pulse detecting circuit according to claim 1, wherein the recharge device is a switch which is open for pulse detection and which is closed in regular or irregular time intervals in order to reset the sense node.

6. The charge pulse detecting circuit according to claim 1, wherein the noise filter is a continuous time high-pass filter with its transition frequency being higher than the bandwidth of the noise generated by the the recharge device but low enough to transmit the signal voltage pulses created as a function of the input charge pulses.

7. The charge pulse detecting circuit according to claim 1, wherein the noise filter is a continuous time band-pass filter with a lower band limit above the bandwidth of the noise generated by the recharge device but low enough to transmit the signal voltage pulses and with an upper band limit high enough to transmit the signal voltage pulses created as a function of the input charge pulses.

8. The charge pulse detecting circuit according to claim 1, wherein the noise filter applies voltage amplification to the transmitted signal voltage pulses.

9. The charge pulse detecting circuit according to claim 1, furthermore comprising at least one comparator that transforms detected voltage pulses into a binary digital signal and at least one digital counter counting digital pulses of the comparator.

10. The charge pulse detecting circuit according to claim 1 fabricated monolithically using semiconductor processing technology.

11. The charge pulse detecting circuit according to claim 9, wherein at least one of the following elements is implemented with MOS transistors: the recharge device, elements of the active buffer, elements of the noise filter.

12. The charge pulse detecting circuit according to claim 1, wherein the sensing device is an opto-electrical detector implemented by either one of the following: homojunction diodes, heterojunction diodes, pinned photodiodes, photogates, and charge coupled devices.

13. The charge pulse detecting circuit according to claim 1, wherein a physical property sensed by the sensing device comprises photons representing the quanta of electromagnetic radiation to be detected, and wherein each photon is creating a pulse comprising at least one charge carrier.

14. An at least one dimensional array of charge pulse detecting circuits according to claim 1.

15. The charge pulse detecting circuit according to claim 4, wherein the noise filter is a continuous time high-pass filter with its transition frequency being higher than the bandwidth of the noise generated by the recharge device but low enough to transmit the signal voltage pulses created as a function of the input charge pulses.

16. The charge pulse detecting circuit according to claim 4, wherein the noise filter is a continuous time band-pass filter with a lower band limit above the bandwidth of the noise generated by the recharge device but low enough to transmit the signal voltage pulses and with an upper band limit high enough to transmit the signal voltage pulses created as a function of the input charge pulses.

17. The charge pulse detecting circuit according to claim 4, wherein the noise filter applies voltage amplification to the transmitted signal voltage pulses.

18. The charge pulse detecting circuit according to claim 6, wherein the noise filter applies voltage amplification to the transmitted signal voltage pulses.

19. The charge pulse detecting circuit according to claim 7, wherein the noise filter applies voltage amplification to the transmitted signal voltage pulses.

20. The charge pulse detecting circuit according to claim 1, wherein the recharge device is configured such that a duration of a recharge transition on the sense node is at least twice as long as a charge pulse width.

* * * * *